United States Patent [19]
Galazin et al.

[11] Patent Number: 5,682,922
[45] Date of Patent: *Nov. 4, 1997

[54] DUAL IN-LINE HEIGHT CONTROL VALVE ASSEMBLY

[75] Inventors: Gregory T. Galazin, Montague; William C. Pierce, Muskegon, both of Mich.

[73] Assignee: NAI Neway, Inc., Muskegon, Mich.

[*] Notice: The term of this patent shall not extend beyond the expiration date of Pat. No. 5,375,819.

[21] Appl. No.: 454,266

[22] PCT Filed: Aug. 26, 1994

[86] PCT No.: PCT/US94/09619

§ 371 Date: May 24, 1995

§ 102(e) Date: May 24, 1995

[87] PCT Pub. No.: WO95/09093

PCT Pub. Date: Apr. 6, 1995

Related U.S. Application Data

[63] Continuation-in-part of Ser. No. 974,064, Nov. 10, 1992, Pat. No. 5,375,819.

[51] Int. Cl.⁶ ............................ F15B 13/04; F16K 31/48
[52] U.S. Cl. .................................. 137/627.5; 137/636.1; 251/54; 280/714
[58] Field of Search ........................ 137/627.5, 636.1; 251/54; 280/714

[56] References Cited

U.S. PATENT DOCUMENTS

| | | | |
|---|---|---|---|
| 2,905,462 | 9/1959 | Christensen | 137/627.5 X |
| 2,929,407 | 3/1960 | Christensen | |
| 2,929,619 | 3/1960 | Christensen | 137/627.5 X |
| 2,929,620 | 3/1960 | Christensen | 137/627.5 X |
| 2,929,621 | 3/1960 | Christensen | 137/627.5 X |
| 2,947,532 | 8/1960 | Christensen | 137/627.5 X |
| 3,006,657 | 10/1961 | Augustin | 137/627.5 X |
| 3,036,596 | 5/1962 | Alfieri | 137/636.1 |
| 3,044,495 | 7/1962 | Alfieri | 137/636.1 |
| 3,099,461 | 7/1963 | Stelzer | 280/714 |
| 3,140,725 | 7/1964 | Alfieri | |
| 4,886,092 | 12/1989 | Barzelay | |
| 5,161,579 | 11/1992 | Anderson | 137/627.5 |
| 5,375,819 | 12/1994 | Galazin et al. | 137/627.5 X |

FOREIGN PATENT DOCUMENTS

| | | |
|---|---|---|
| 1190420 | 3/1959 | France . |
| 1208342 | 9/1959 | France . |
| 1246754 | 10/1960 | France . |
| 1112910 | 8/1961 | Germany . |
| 840649 | 7/1960 | United Kingdom . |

*Primary Examiner*—Gerald A. Michalsky
*Attorney, Agent, or Firm*—Varnum, Riddering, Schmidt & Howlett LLP

[57] ABSTRACT

A valve assembly for controlling delivery and exhaust of pressurized air to and from an air spring. The valve assembly comprises a body having a pair of valve bores with a coaxially open end, and a port in communication with the valve bore. The port is adapted to receive an air connection with an air spring. An actuator shaft, having a first end and a second end, is disposed coaxially in the valve bore for reciprocal movement between an actuating position and a rest position, and is biased toward the rest position. A valve block fixes within the valve bore and has an internal end and an external end. A coaxial bore extends from the internal end to the external end and slidably receives the actuator shaft second end. A stop chamber is disposed between the external end and the internal end. The valve block has a seat on the external end at the coaxial bore. An air passage communicates with the port and the coaxial bore. A stop member mounts on the actuator shaft within the stop chamber so that the actuator shaft second end will be spaced within the coaxial bore inwardly from the seat when the actuator shaft is in the rest position. Movement of the actuator shaft relative to the valve body is limited to the distance the stop moves within the stop chamber.

18 Claims, 9 Drawing Sheets

DUAL IN-LINE HEIGHT CONTROL VALVE ASSEMBLY

This is a continuation-in-part of U.S. patent application Ser. No. 07/974,064, filed Nov. 10, 1992, now U.S. Pat. No. 5,375,819, issued Dec. 27, 1994.

BACKGROUND OF THE INVENTION

1. Field of the Invention

The invention relates to control valves, and more particularly to control valve assemblies having separate intake and exhaust valves controlled by a cam.

2. State of the Prior Art

Air suspension systems have become increasingly popular for use in vehicle suspensions, seats, and cabs on semi-trailer truck rigs and other vehicles. Each requires a height control valve which maintains the design height of the suspension. In a semi-trailer suspension the design height is the desired spacing between the frame and the axle. The height control valve senses when the spacing is greater or less than its design height, and accordingly adjusts the pressure in the air springs disposed between the frame and axle. The air suspension system with a height control valve maintains a uniform height of the air spring over a range of vehicle loading conditions.

Some height control valves immediately respond to changes in vehicle height as the vehicle moves. But other height control valves are designed not to respond to momentary changes in the design height. A time delay mechanism in the valve delays actuation of the valve for a specified time after the valve senses a change in height, preventing the valve from reacting to temporary height changes. A dead band in the height sensing portion of the valve prevents the valve from attempting to correct every minute change in height.

U.S. Pat. No. 3,884,454 issued May 20, 1975 to Passmore discloses a height control valve having an attached vane damper in which a vane rotates in a fluid filled damping chamber in response to height changes. A filling or exhaust valve is actuated to adjust the air spring only after the vane has rotated a specified amount. As the vane rotates away from its rest position, incompressible damping fluid must pass through the small space between the end of the vane and the chamber wall, slowing the motion of the vane. As the vane returns to the center of the chamber, a check valve opens to allow the fluid to quickly flow through a bypass channel. The vane thus causes the valve to open slowly, yet close quickly. The vane damper works well but is bulky and somewhat complicated. Also, the vane damper is not an integral part of the valve actuator, adding to the overall bulk and complexity of the valve.

Other height control valves employ a double ended piston, slidably mounted on an actuator rod, and adapted for reciprocal movement within a double ended fluid filled damping chamber in response to rotational movement of a height sensing arm. As one end of the piston enters an end of the chamber from the piston at rest position, the fluid is forced past the piston, thereby retarding the piston movement. Flapper valves on the piston provide a check valve to pass fluid through the piston as the piston returns to its rest position quickly. The forward portion of each end of the piston has a large clearance so that as the piston returns to the central at rest position and an end of the piston starts to enter an end of the chamber, there is a sufficient gap to allow fluid to freely flow past the piston and quickly return to center. Only as the piston moves from the center position is its movement retarded.

The piston must move a specified distance along the actuator rod before it strikes a projection thereon and actuates the air valve. Movement of the actuator rod in one direction opens a valve to fill the air spring, and movement of the actuator rod in the opposite direction opens another valve to exhaust air from the air spring. The piston has many surfaces with close tolerances making manufacturing more difficult.

SUMMARY OF THE INVENTION

The invention provides a compact valve assembly well suited to applications where space is critical, such as an air suspension for a driver's seat. It contains relatively few parts, enhancing its reliability and reducing manufacturing complexity and expense.

A valve assembly according to the invention comprises a body having a first valve bore and a control bore transverse to and intersecting the first valve bore. A first port is open to a pressure chamber in the body. A second port is open to a second valve bore collinear with the first valve bore, the second bore also having a first end open to the first valve bore and a second end open to the pressure chamber. A sealing member seals the second end of the valve bore when it is seated upon a valve seat in the body at the second valve bore second end. An actuator shaft disposed coaxially in the first and second valve bores has a first end and a second end, the first end being disposed within the first bore and the second end being disposed in the second bore adjacent the valve seat. Axial movement of the actuator shaft second end past the valve seat displaces the sealing member from the valve seat while an actuator shaft biasing member between the body and the actuator shaft biases the actuator shaft away from the valve seat. A spring cup is provided in the first valve bore. A first end of the spring cup abuts the actuator shaft and a spring cup biasing member biases the spring cup toward the actuator shaft.

A control member rotatably mounted within the control bore has an abutment surface abutting the first end of the spring cup. Preferably, the control member has two arm mounting faces, one on each side of the valve so that the valve can be mounted on the right or left side of the vehicle. Abutment of the spring cup with the control member abutment surface limits movement of the spring cup toward the actuator shaft and rotation of the control member moves the abutment surface axially in the first valve bore. Thus, rotation of the control member in one direction moves the control member abutment surface toward the valve seat and thereby moves the spring cup and the actuator shaft toward the valve seat to displace the sealing member from the valve seat and place the first and second ports into fluid communication with each other.

Preferably, the first valve bore is filled with an incompressible fluid. The actuator shaft then further comprises a piston having a first side and a second side which is disposed within the first valve bore whereby the piston and fluid dampen movement of the actuator shaft to provide a time delay in actuating the valve. A piston check valve can be provided on the piston to enhance the flow of fluid from the first side of the piston to the second side of the piston as the actuator shaft moves away from the valve seat, and to restrict flow of fluid from the second side of the piston to the first side of the piston as the actuator shaft moves toward the valve seat. The piston check valve preferably comprises at least one aperture through the piston and a flexible flap abutting the piston second side and covering the aperture.

Further, the piston preferably comprises a seal abutting the valve body in the second bore and a metering orifice through the piston whereby the size of the metering orifice controls the damping effect of the piston as the actuator shaft moves toward the valve seat. A filter screen protects the metering hole from contaminates. The filter screen is retained in the piston.

Preferably, the spring cup further comprises a port between the first end of the spring cup and a second end of the spring cup, and a check valve associated with the spring cup port to permit the flow of fluid through the port from the first end of the spring cup to a second end of the spring cup as the spring cup moves away from the valve seat, and to restrict flow of fluid through the port from the second end of the spring cup to the first end of the spring cup as the spring cup moves toward the valve seat. To avoid interference with the control member abutment surface, the spring cup first end preferably comprises an extension extending toward the valve seat past the control member abutment surface. The spring cup check valve is then located on the extension and the spring cup port is located in the extension.

Preferably, the spring cup first end comprises a first surface for contact with the control member and a second surface abutting the actuator shaft with an adjusting element being provided for adjusting the position of the first surface with respect to the second surface. Thus, a neutral position of the actuator shaft can be adjusted by the adjusting element. The adjusting element preferably comprises an adjusting screw threaded axially through a wall of the spring cup with the second spring cup surface being formed by an end of the adjusting screw.

Also preferably, the spring cup and actuator shaft form a driver, and further comprise a stop between the driver and the body to limit the axial movement of the driver in the body away from the valve seat. Further, a second stop can be provided between the driver and the body to limit the axial travel of the actuator shaft toward the valve seat. The first stop preferably comprises a body abutment surface located on the body and extending into the first valve bore and a driver abutment surface located on the actuator shaft. The second stop preferably comprises a body abutment surface on the body and extending into the first valve bore and a driver abutment surface on the spring cup in interfering relationship with the body abutment. This structure combined with the adjusting element in the spring cup allows the block assembly to be adjusted in or out after the valve is filled to change dead zone/time delay.

In a further aspect of the invention, a valve assembly comprises a body having a first valve bore and a control bore transverse to and intersecting the first valve bore. A first port is open to a pressure chamber in the body. A second port is open to a second valve bore collinear with the first valve bore, the second bore also having a first end open to the first valve bore and a second end open to the pressure chamber. A sealing member seals the second end of the valve bore when it is seated upon a valve seat in the body at the second valve bore second end. An actuator shaft disposed coaxially in the first and second valve bores has a first end and a second end, the first end being disposed within the first bore and the second end being disposed in the second bore adjacent the valve seat. Axial movement of the actuator shaft second end past the valve seat displaces the sealing member from the valve seat while an actuator shaft biasing member between the body and the actuator shaft biases the actuator shaft away from the valve seat. A control member rotatably mounted within the control bore operably couples to the actuator shaft for axial movement of the actuator shaft upon rotation of the control member. A motion damping piston on the actuator shaft has a first side and a second side, and is disposed within the first valve bore. The first valve bore is filled with an incompressible fluid wherein the piston and fluid dampen movement of the actuator shaft to provide a time delay in actuating the valve.

BRIEF DESCRIPTION OF THE DRAWINGS

The invention will now be described with reference to the accompanying drawings in which.

DETAILED DESCRIPTION OF THE DRAWINGS

Figure 1:
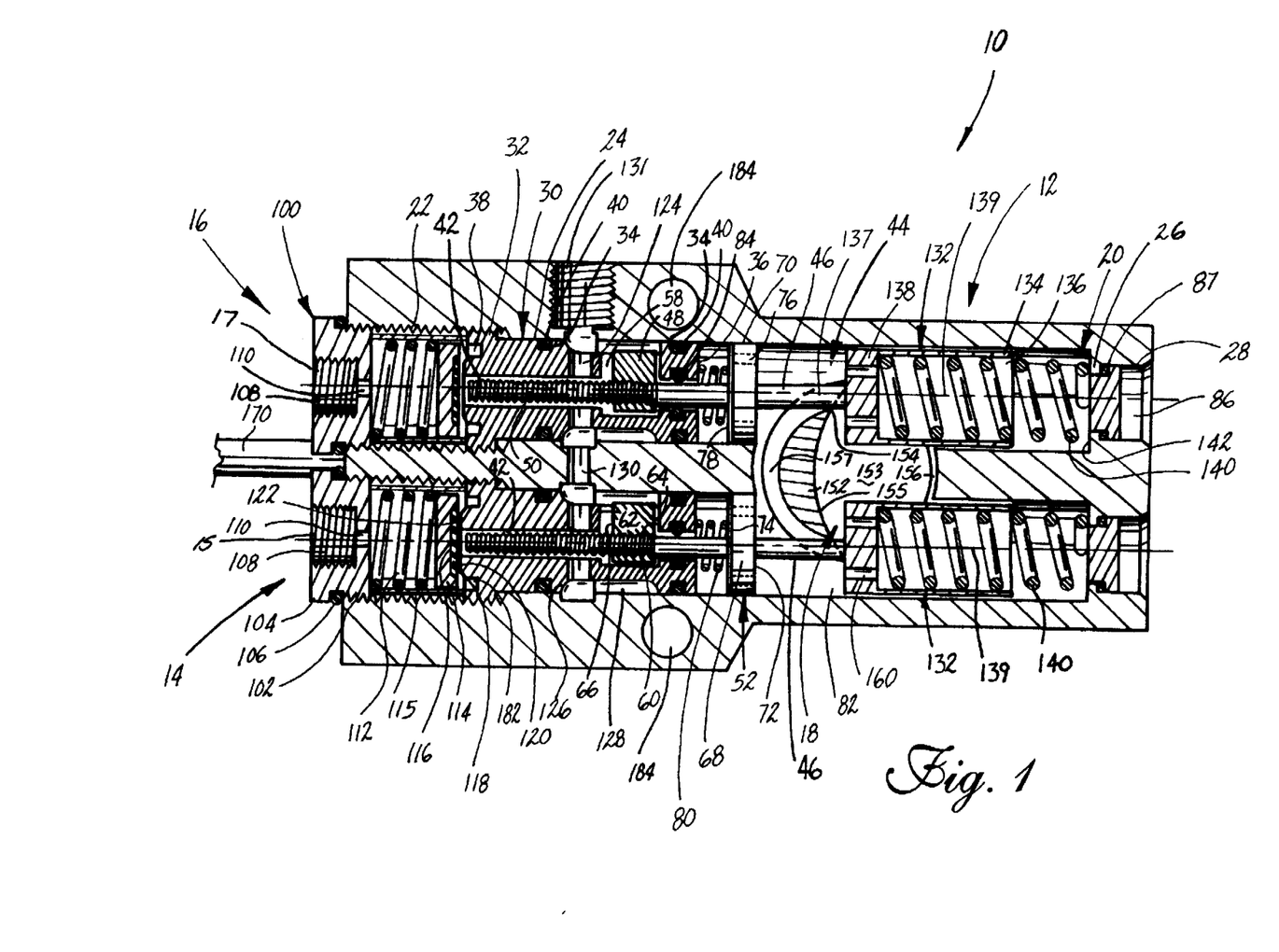
FIG. 1 is a sectional side elevation of a valve assembly according to the invention.

Referring to the drawings, and to FIG. 1 in particular, a height control valve assembly 10 according to the invention comprises generally a valve body 12 having an intake valve 14, an exhaust valve 16 and a control cam 18 which controls the operation of the intake and control valves 14 and 16. A source of high pressure air (not shown) connects to the intake valve 14 at an intake port 15 and the exhaust valve 16 is open to atmosphere through an exhaust port 17.

The intake valve 14 and exhaust valve 16 are physically similar and operate similarly. Therefore, like parts in the intake and exhaust valves 14 and 16 will be given like reference numerals. Also, the construction and operation of the intake valve 14 will thus apply to the construction and operation of the exhaust valve 16.

The intake valve 14 and exhaust valve 16 each comprise a round bore 20 into the valve body 12, having a threaded entrance 22 (to the left as shown in FIG. 1), and a slightly narrower diameter non-threaded central section 24. Towards the opposite end of the body 12, the bore 20 reduces in diameter to approximately half the diameter of the central section 24, to form a neck 26, and expands to form an exit bore 28 of an intermediate diameter between the diameter of the central section 24 and neck 26.

The bore 20 coaxially receives a valve block 30, which has threads 32 on its outer surface that engage the threaded entrance 22 of the bore 20 to firmly lock the block 30 within the bore 20. The valve block 30 is cylindrical and sized to be received within the central section 24 of the bore 20 with close tolerances. A pair of annular grooves 34 traverse the circumference of the valve block 30, one near its internal end 36, and one towards its external end 38, yet internal to the threads 32. Each of the annular grooves 34 receives a circular gasket 40 which seals the valve block 30 to the bore 20.

A central valve block bore 42 extends from the valve block external end 38 to the valve block internal end 36, and receives a shaft 46 of a valve actuator 44. The valve actuator 44 also comprises a threaded stop 48 threaded onto a threaded section 50 of the actuator shaft 46, and a check valve 52 mounted on the actuator shaft 46.

The stop 48 has a threaded aperture 56 (see also FIG. 3) which threadably receives the valve actuator shaft threads 50. A stop chamber 58 in the valve block 30 receives the stop 48 to limit axial movement of the actuator shaft 46. In cross-section, the stop 48 is rectangular, with one end 54 of the stop 48 projecting radially from the actuator shaft 46 and being curved to adapt to the inside curvature of the central section 24 of the bore 20.

The stop 48 and stop chamber 58 limit travel of the actuator shaft 46, and properly position it when the valve 14 (or 16) is at rest. The space between an internal wall 60 and an external wall 62 defines the width of the stop chamber 58, which exceeds the width of the stop block 48 defined by the distance between its internal face 64 and external face 66. The stop 48 is positioned on the valve actuator shaft 46 so that the external end of the valve actuator shaft 46 extends to within 0.014 inches of the entrance to the bore 42. The width of the stop chamber 58 exceeds the width of the stop 48 by 0.06 inches, thus restricting lateral movement of the valve actuator shaft 46 within the bore 20 to 0.06 inches. These tolerances reduce sensitivity and provide a dead band as will be more fully explained hereinafter.

The check valve 52 comprises a check valve disc 68 mounted on the valve actuator shaft 46 inwardly of the valve block 30 from the bore entrance 22. The flat circular check valve disc 68 comprises a radial outer edge 70, an internal face 72 and an external face 74. Four apertures 76, located midway between the outer radial edge 70 and the center of the disc 68, penetrate the disc 68 at locations spaced 90 degrees apart about the disc 68. A thin plastic diaphragm 78 operates against the external face 74 of the check valve disc 68 and extends from the valve actuator shaft 46 radially outwardly past the check valve disc apertures 76. A coil spring 80 coaxially receives the valve actuator shaft 46 through its coils and operates between the valve block 30 and the external face 74 of the check valve disc 68, to bias the valve actuator shaft 46 away from the valve block 30, and inwardly of the bore 20.

The check valve 52 acts as a one way damper, restricting movement of the actuator shaft 46 outwardly of the bore 20, while freely allowing movement of the actuator shaft 46 inwardly of the bore 20. It is to be noted that inward movement is in a direction from left to right while outward movement is in a direction from right to left, as viewed in FIG. 1. A silicone based incompressible damping fluid 82 fills the bore 20 internal of the valve block 30, and restricts movement of the valve actuator shaft 46 outwardly of the bore 20. The check valve disc 68 compresses the damping fluid 82 between its external face 74 and the valve block 30. The diaphragm 78 acting against the external face 74 of the check valve disc 68 prevents damping fluid 82 from passing through the check valve disc holes 76 as the check valve disc 68 moves outwardly of the bore 20. Movement of the check valve disc 68 outwardly of the bore 20 thus requires damping fluid 82 to pass through the narrow space between the check valve disc outer radial edge 70 and the wall of the central section 24 of the bore 20, which preferably has a clearance of 0.003 inches. The check valve disc 68 thus acts as a natural damper, restricting and slowing the movement of the valve actuator shaft 46 outwardly of the bore 20.

However, the diaphragm 78 does not block passage of damping fluid 82 through the disc holes 76 as the check valve disc 68 moves inwardly of the bore 20. Thus, the check valve 52 provides little damping action in this direction, allowing the valve actuator shaft 46 to move inwardly of the bore 20 with little restriction by the damping fluid 82. The one way damping action of the check valve 52 reduces the sensitivity of the height control valve assembly 10 as will be more fully explained hereinafter.

The damping fluid 82 is prevented from passing past the valve block internal end 36 by the gasket 40. A shaft packing 84 seals the valve actuator shaft 46 as it passes through the valve block bore 42, and is received within an annular groove located near the internal end 36 of the valve block 30. The internal end of the bore 20 containing the damping fluid 82 is sealed by a plug 86 and gasket 87 inserted into the exit section 28 of the bore 20.

An end plug 100 screws into the external end of the threaded section 22 of the bore 20, by means of threads 102 on the internal portion of the plug 100. An annular flange 104 extends outwardly radially at the exterior end of the plug 100 and compresses an O-ring or other gasket 106 between itself and the valve body 12 as the plug 100 is screwed into the threaded section of the bore 22. A threaded hole 108 extends partway through the end plug 100 from its external end, and is adapted to receive a fitting from a high pressure air source (not shown). An air hole 110 extends from the threaded hole 108 through the remainder of the end plug 100.

A coil spring 112 operates within the space between the end plug 100 and the valve block 30, and biases an air seal 114 against the valve block 30 at the entrance of the valve block bore 42 in the valve block 30. A tubular insert 115, may be provided around the spring 112, to prevent its coils from catching on the threaded surface of the hole 108.

The air seal 114 comprises a round flat disc having a shallow well 116 on one face, which is in a confronting relationship with the valve block bore 42. The well is filled with an elastomeric material 118 to provide a positive seal between the air seal 114 and the valve block bore 42. A rounded annular flange 120, preferably extends outwardly axially from the valve block 30 at the entrance of the valve block bore 42, to form a distinct sealing surface 122 for sealing against the elastomeric material 118 in the air seal well 116. The air seal spring 112 biases the air seal 114 against the sealing surface 122 with sufficient spring force to prevent high pressure air from entering the valve block bore 42.

However, if the valve actuator shaft 46 moves outwardly of the valve block bore 42, moving the air seal 114 away from the sealing surface 120, the valve block bore 42 becomes in pressure communication with the high pressure air source. The valve actuator shaft 46 is of substantially lesser diameter than the valve block bore 42 so that pressurized air can freely flow through the valve block bore 42. One or more radial air passages 124 extend outwardly radially from the valve block bore 42 to a reduced external diameter portion 126 of the valve block 30, located between the gaskets 40, which forms an exchange chamber 128 between the valve block 30 and the bore 20. An air passage 130 connects the exchange chamber 128 of each valve 14, 16 to each other and to the exterior of the valve body 12, and exits the valve body 12 at a port 131 which may be tapped to receive an air line fitting from the air receiving device such as a vehicle air spring 174 (see FIG. 5) Thus, when the valve actuator shaft 46 of the intake valve 14 moves outwardly, to disengage the air seal 114, the air passage 130 comes into pressure communication with the high pressure air source (not shown) connected to the threaded connection 108 on the end plug 100.

The position of the valve actuator shaft 46 is controlled by the control cam 18 acting on a spring cup 132 which is received within the inward-most portion of the bore 20 central section 24. The spring cup 132 comprises a tubular body 134 of circular cross section, having an open end 136, and a wall 138 at the opposite end, the wall 138 being in contact, yet not attached to, the inward end of the valve actuator shaft 46. A central axis 137 of the actuator shaft is aligned with a central axis 139 of the spring cup 132, with each axis 137, 139 centrally positioned in the valve bore 20. A helical compression type actuator spring 140 is coaxially received within the tubular body 134, extending from the end wall 138 out of the open end 136, to a wall 142 formed by the transition between the central section 24 and the neck 26 of the bore 20. The actuator spring 140 tends to urge the spring cup 132 away from the wall 142, outwardly of the bore 20. The spring force of the actuator spring 140 is greater than the combined spring forces of the check valve coil spring 80 and the air seal spring 112, and, if unrestrained, would tend to urge the valve actuator shaft 46 outwardly of the valve block bore 42, opening the air seal 114 so that pressurized air can flow in through the intake valve 14, or alternatively out through the exhaust valve 16.

The spring cup 132 must be able to operate freely in the valve bore 20. A series of longitudinal bypass grooves 158, of semi-circular cross section, extending the length of the outer surface of the spring cup 132, and a series of bypass holes 160 in the spring cup end wall 138, allow damping fluid 82 to freely flow past the spring cup 132 as it operates in the valve bore 20. Thus, the damping fluid 82 will not significantly impede the movement of the spring cup 132 in the bore 20.

Figure 2:
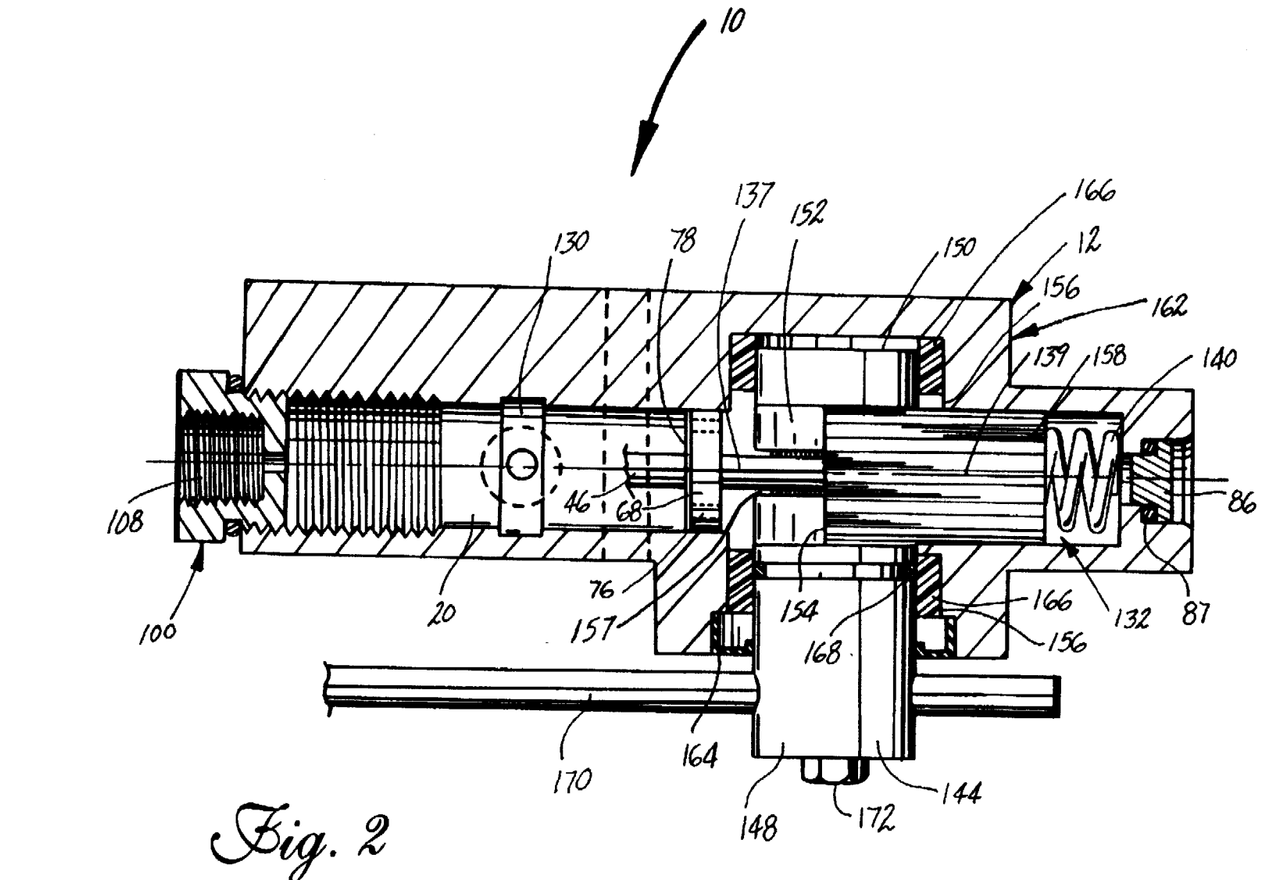
FIG. 2 is a section plan view of the valve assembly of FIG. 1.
Figure 3:
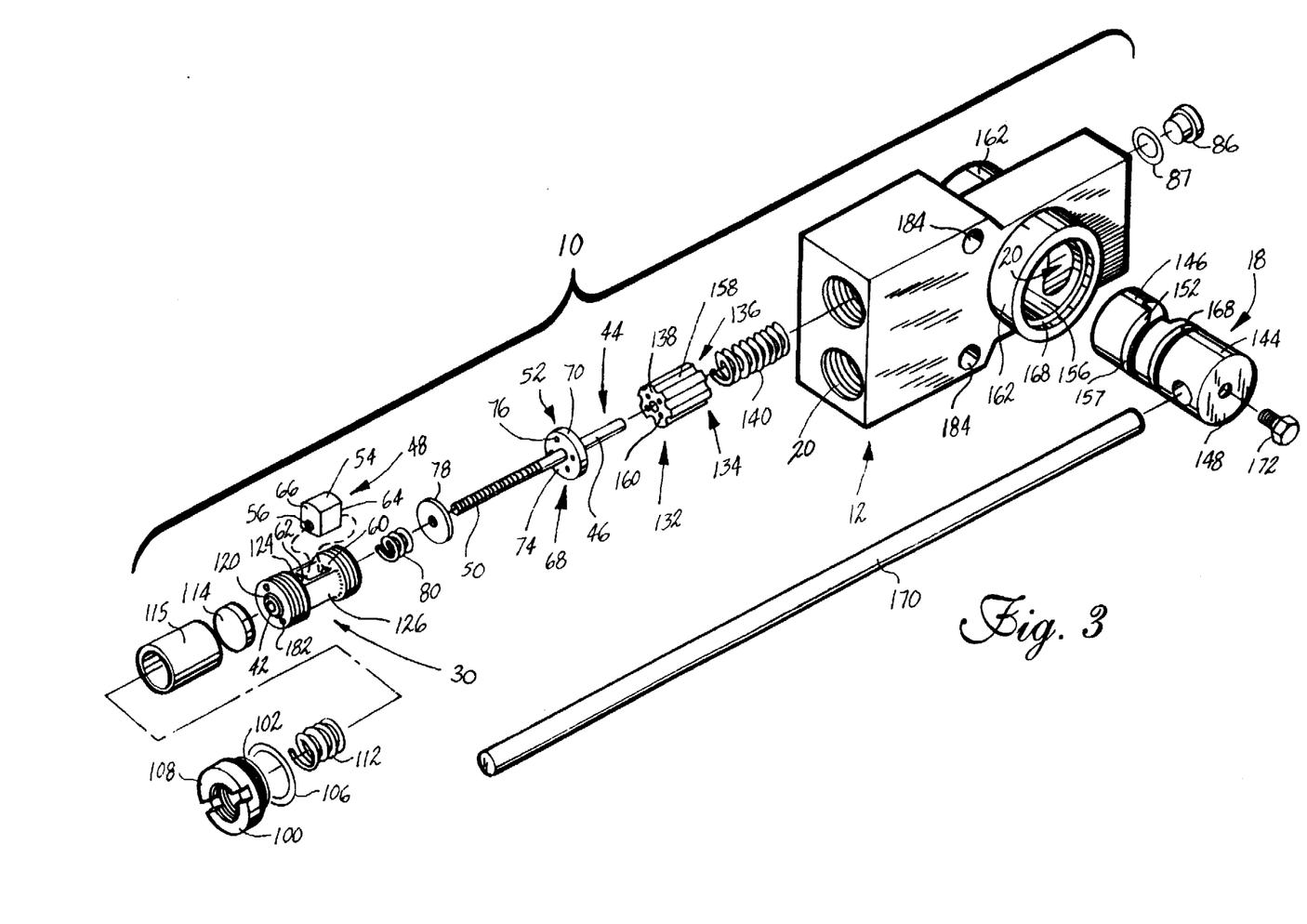
FIG. 3 is an exploded perspective view of the valve assembly of FIG. 1.

Looking more closely at FIGS. 1 through 3, the control cam 18 comprises a generally cylindrical body 144 received through the side of the valve body 12 in a control bore 156. The control bore 156 intersects both valve bores 20, placing portions thereof into fluid communication with one another (see FIG. 1). The control cam 18 comprises an inner end 146 disposed within the control bore 156, and an outer end 148 extending outwardly of the valve body 12.

Figure 4:
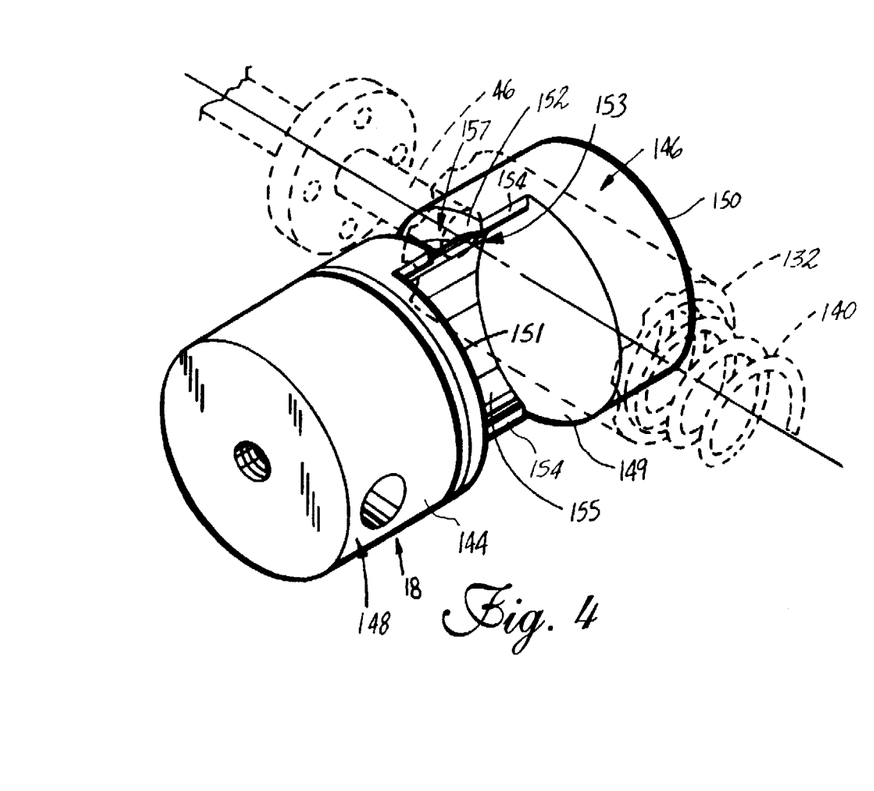
FIG. 4 is a perspective view of a control cam according to the invention for use within the valve assembly of FIG. 1.

With particular reference now to FIG. 4, a cam lobe 152 is formed in the control cam 18 intermediate the ends 146, 148. The cam lobe 152 is disposed between opposing surfaces 149 and 151, and is defined in part by one or more contact surfaces 154 and a face 155 which slopes away from the contact surfaces 154. The cam lobe 152 is preferably formed by notching a side wall of the cam body 144. In the preferred embodiment, the surface 155 will have a radius of curvature approximately equal to, or slightly greater than, twice the diameter of the cam body 144. An annular groove 157 is formed in the cam body 152 on the exterior surface of the cam body 144 to provide clearance for the valve actuator shafts 46.

The cam lobe 152 thus formed is crescent shaped in cross section having two contact surfaces 154 at its points, which may be rounded off or cut flat to form a stronger and smoother contact surface 154. Each contact surface 154 operates against the end wall 138 of one of the spring cups 132. One contact surface 154 acts against the filling valve 14 spring cup 132, and the other contact surface 154 acts against the exhaust valve 16 spring cup 132. The crescent shape ensures that the contact surfaces 154 are well defined, and prevents the surface in between the two contact surfaces 154 from actuating the spring cups 132, thus freeing the spring cups 132 for greater outward travel without interference from surface 155.

Turning also to FIG. 2, the control cam 18 fits into the control bore 156 through the side of the valve body 12. The control bore 156 intersects both valve bores 20, placing the portions thereof containing the damping fluid 82 into fluid communication with one another (see FIG. 1), and extends beyond the valve bores 20 without passing completely through the valve body 12. An annular groove 157 in the outside surface of the control cam body 144 at the middle of the portion containing the cam lobe 152, allows the valve actuator shafts 46 to clear the cam lobe (see also FIG. 4). The valve body 12 may be thickened around the cam cylinder 156 by forming annular collars 162 on the valve body 12 where the cam cylinder 156 enters and at the opposite side of the valve body 12 to allow the cam cylinder 156 to be deeper, providing more support for the control cam 18 as it rotates.

A Teflon™ disc thrust bearing 164 and Teflon™ bushing bearings 166 around the control cam body 144 on either side of the cam lobe 152, provide low friction surfaces for the control cam 18 to operate against. A shaft packing 168, in an annular groove about the control cam body 144 external to the valve bores 20 seals the control cam 18 to prevent leakage of damping fluid 82 out of the valve bores 20 through the control bore 156.

The control cam body 144 extends out of the valve body 12. Any manner of rotational control may be applied to the control cam 18. A preferred system involves a control arm 170 penetrating the control cam body 144 radially and extending horizontally parallel to the valve bores 20. A set screw 172 through the end of the control cam body 144 locks the control arm 170 in place. As external forces cause the control arm 170 to move off horizontal, it rotates the control cam 18.

Figure 5:
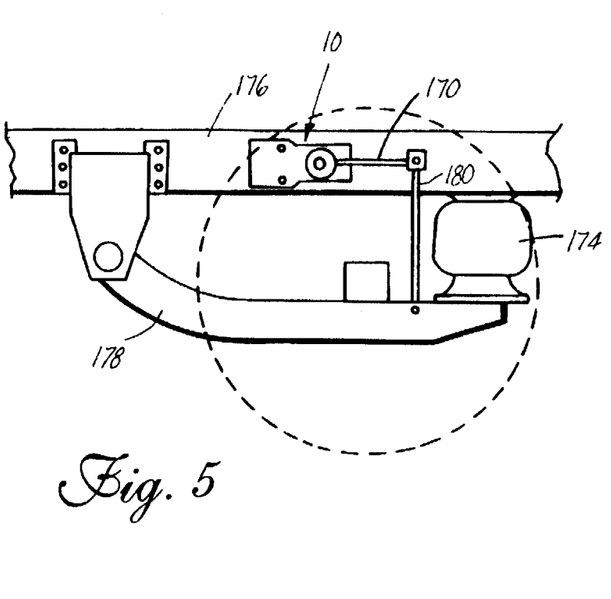
FIG. 5 is a side elevation of a semi-trailer suspension employing the valve assembly of FIG. 1.

Turning to FIG. 5, the height control valve assembly 10 can be used to control the height of a semi-trailer air spring 174, which operates between a truck frame 176, and a trailing arm 178. The valve assembly 10 mounts on the truck frame 176, and the control arm 170 connects to the trailing arm 178 through a linkage 180. The linkage 180 is adjusted so that when the air spring 174 is at the proper height, the control arm 170 is in the neutral or horizontal position. When the air spring 174 height is too low, the trailing arm 178 will be closer to the frame 176, causing the control arm 170 to rise above the horizontal. When the air spring 174 is too high, the control arm 170 will fall below horizontal.

Returning to FIG. 1, the high pressure air supply (not shown) is connected to the intake port 15 on the intake valve 14, and the air spring (not shown in FIG. 1) is connected to the device port 131 on top of the valve body 12. The exhaust port 17 on the exhaust valve 16 is left open to the atmosphere.

When the control arm 170 rises above the horizontal, it rotates the control cam 18 clockwise, causing the lower cam lobe surface 154 to move away from the spring cup 132 on the intake valve 14, allowing the actuator spring 140 to drive the spring cup 132, actuator shaft 46 and thus the intake valve air seal 114 outwardly of the valve bore 20. The intake port 15 is thus in pressure communication with the device port 131, allowing air to flow into the air spring 174 (not shown in FIG. 1). In this state, the spring cup 132 on the exhaust valve 16 is driven inwardly away from the actuator shaft 46, which has no effect upon the exhaust valve 16, which remains closed. If the control arm 170 falls below horizontal, the control cam 18 rotates counter-clockwise, opening the exhaust valve 16, while keeping the intake valve 14 closed.

The design of the height control valve assembly 10 provides a relative degree of stability due to the gap between each actuator shaft 46 and its corresponding air seal 114, in conjunction with the damping from the check valve 52 operating in the damping fluid 82. The check valve 52 prevents the actuator shaft 46 from moving outwardly quickly. Preferably the gap between the check valve disc 68 and the bore 20 is set to so that, under the force of the actuator spring 140, the actuator shaft takes over 5 seconds to travel the distance of the gap between the actuator shaft 46 and the air seal 114 to open the intake valve 14. The exhaust valve 116 is similarly adjusted. The gap between the actuator shaft 46 and the air seal 114 also provides a "dead band", where the control arm 170 can move without actuating either the intake or exhaust valves 14, 16. Thus, when the truck is traveling over rough roads, the height control valve assembly 10 valve will not be overly sensitive, attempting to adjust the air spring 174 for every bump in the road.

The design of the control cam lobe 152 provides for easy assembly of the height control valve 10. The crescent shaped cross section of the control cam lobe 152 occupies less than half of the cross sectional area of the control cam 18. Thus, when the control cam 18 is rotated a full 90 degrees, the control cam lobe 152 moves out of the path of the bore 20. The spring cup 132 and actuator spring 140 can then be inserted into the bore 20, past the control cam 18. The control cam 18 is rotated the opposite direction, compressing the first spring cup 132, to insert the remaining spring cup 132 and actuator spring 140. The remaining parts are then easily assembled. Holes 182 (FIG. 3) may be provided in the external end 38 of the valve block 30 so that the valve block 30 can be tightened with a spanner wrench (not shown). Mounting holes 184 penetrate the body 12 for easy mounting of the valve body 12 to the truck frame 176 or other surface.

Figure 6:
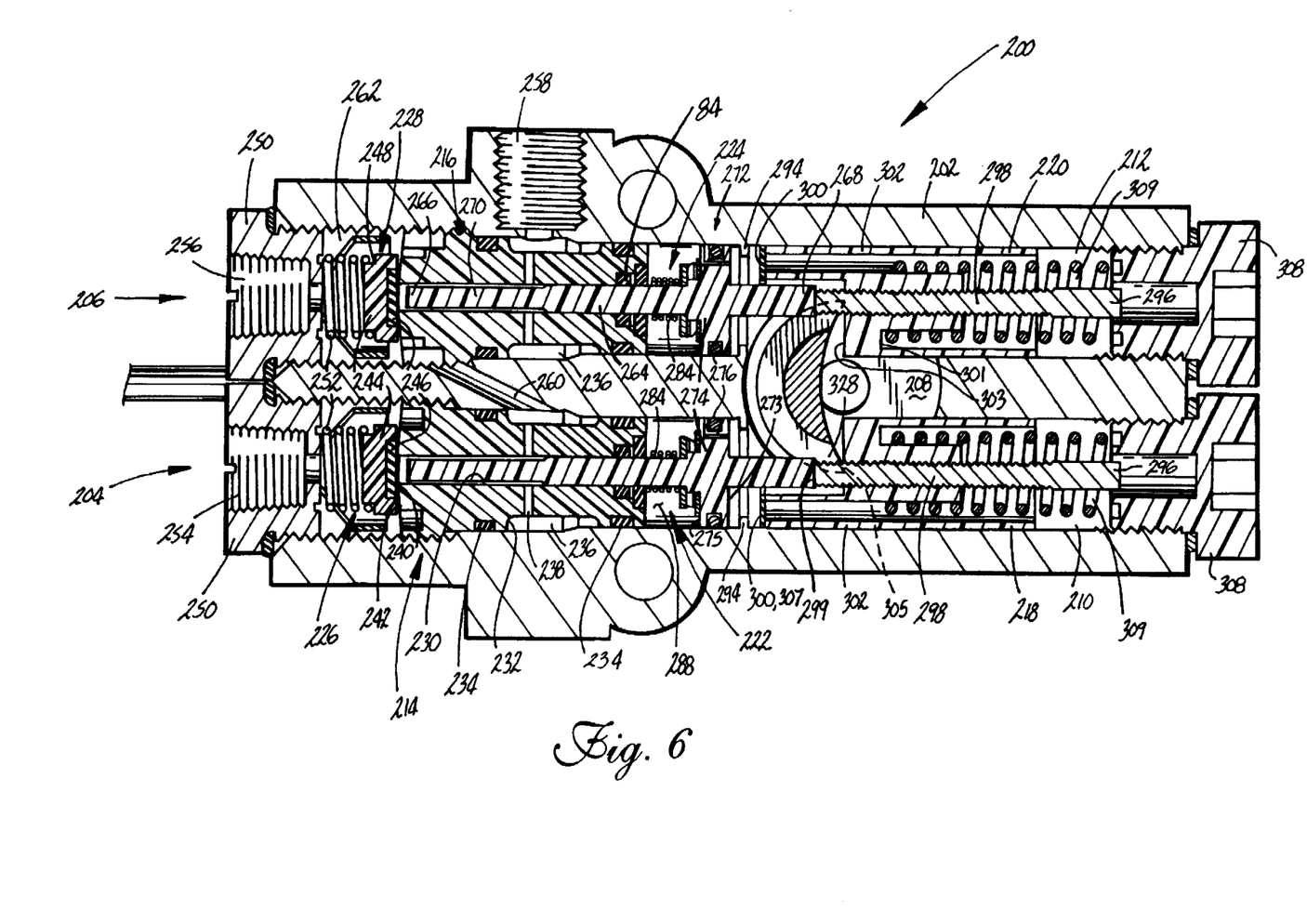
FIG. 6 is a sectional side elevation of a second embodiment of a valve assembly according to the invention.

Now turning to FIG. 6, a second embodiment of a height control valve assembly 200 according to the invention is illustrated comprising generally a valve body 202 having an intake valve 204, an exhaust valve 206 and a control cam 208 which controls the operation of the intake and exhaust valves 204 and 206 in a similar fashion to the first embodiment height control valve assembly 10. However, the valve assembly 200 is plumbed differently than the valve assembly 10 to improve the longevity of the valve assembly 200.

The intake valve 204 comprises a valve bore 210 extending through the body 202 and the exhaust valve 206 comprises a valve bore 212 extending through the body 202. Intake and exhaust valve spools or blocks 214 and 216 are disposed in the intake and exhaust valve bores 210 and 212, respectively, as in the previous embodiment. Also as in the previous embodiment, the control cam 208 controls movement of an intake valve spring cup 218 and exhaust valve spring cup 220 which in turn control axial movement of an intake valve actuator 222 and exhaust valve actuator 224 disposed within the intake and exhaust valve bores 210 and 212, respectively. Each of the intake and exhaust valve actuators 214 and 216, respectively, control seating and unseating of intake and exhaust disc valves 226 and 228 as in the previous embodiment.

As can thus be seen, the height control valve assembly 200 has similar construction to the height control valve 10 of the previous embodiment. However, it has several important differences in its construction and operation. The details of the height control valve assembly 200 will be described to illustrate the differences between it and the first embodiment of the height control valve 10. As in the description of the previous embodiment, the major components of the intake valve 204, namely the valve block 214, spring cup 218, valve actuator 222 and disc valve 226 are essentially identical to the same major components in the exhaust valve 206. Accordingly, the details of their construction will be applicable to both sets of parts and identical part names and reference numerals will be applied to detailed description of the major components of both the intake and exhaust valves 204 and 206.

Each of the valve blocks 214 and 216 comprises a coaxial bore therethrough 230 and an annular groove 232 about its outer circumference to provide an overall spool-like appearance. A pair of O-rings 234 seals each of the intake and exhaust valve blocks 214 and 216 within its respective valve bore 210 and 212 whereby an annular chamber 236 formed therein by the annular groove 232 is isolated from the remainder of the valve bores 210 and 212. Radial passages 238 lead from the coaxial bore 230 to the annular chamber 236.

A valve seat 240 is formed at one end of the coaxial bore 230 and comprises a slightly conical end face 242 on the respective valve block 214 or 216. Preferably, the conical face 242 has a three degree taper. The disc valves 226 and 228 seal against the valve seats 240 on the respective valve blocks 214 and 216. Each disc valve 226 and 228 comprises a discoidal body 244 having an elastomeric insert 246 on one face and a spring seat 248 on an opposite face. End plugs 250 are provided in both the intake and exhaust valve bores 210 and 212 as in the previous embodiment. A seating spring 252 extends from each end plug 250 to the spring seat 248 on the respective disc valve body 244 to bias the intake and exhaust disc valves 226 and 228 into engagement with the valve seats 240 on the intake and exhaust valve blocks 214 and 216, respectively.

Due to a difference in the plumbing of the height control valve assembly 200, the seating springs 252 can have a lower spring force than the air seal springs 112 of the previous embodiment. The end plug 250 on the intake valve bore 210 forms an air supply port 254 and the end plug 250 on the exhaust valve bore 212 forms a device port 256 for connecting the height control valve 200 to an air spring or the like, such as the air spring 174 illustrated in FIG. 5 of the previous embodiment. An exhaust port 258 is provided in the valve body 202 and is in fluid communication with the annular chamber 236 in the exhaust valve bore 212. The location of the device port 256 and exhaust port 258 are reversed with respect to the previous embodiment of the height control valve 10. An air passage 260 extends between the annular chamber 236 in the intake valve 204 and a device port chamber 262 in the exhaust valve bore 212 defined between the end plug 250 and exhaust valve block 216. Thus, the device port 256 remains in constant fluid communication with the coaxial bore 230 of the intake valve block 214 through the device port chamber 262, air passage 260, annular chamber 236 in the intake valve 204 and radial passages 238 from the annular chamber 236 into the coaxial bore 230. The air passage 260 always provides a higher pressure on the back side of disc valve body 244 to maintain a seal at the valve seat 240. Thus, springs 252 and 309 can have a lower spring rate which in turn will minimize wear on the spring cup faces 303.

In this alternate plumbing arrangement, the seating springs 252 can have a relatively low spring force, thereby reducing wear on the disc valve elastomeric inserts 246. Air pressure at the intake port 254 naturally biases the intake disc valve 226 into sealing engagement with the valve seat 240 on the intake valve block 214 and air pressure in the control device such as an air spring at the device port 256 naturally biases the exhaust disc valve 228 into sealing engagement with the valve seat 240 on the exhaust valve block 216. When the intake valve actuator 222 unseats the intake disc valve 226, air flows from the intake port 254 through the passage 260, into the device port chamber 262 and out through the device port 256. When the exhaust valve actuator 224 unseats the exhaust disc valve 228, air flows from the device port 256 past the exhaust disc valve 228 and out the exhaust port 258. Thus, the seating springs 252 do not need to overcome high pressure differentials on the intake and exhaust disc valves 226 and 228.

Figure 7:
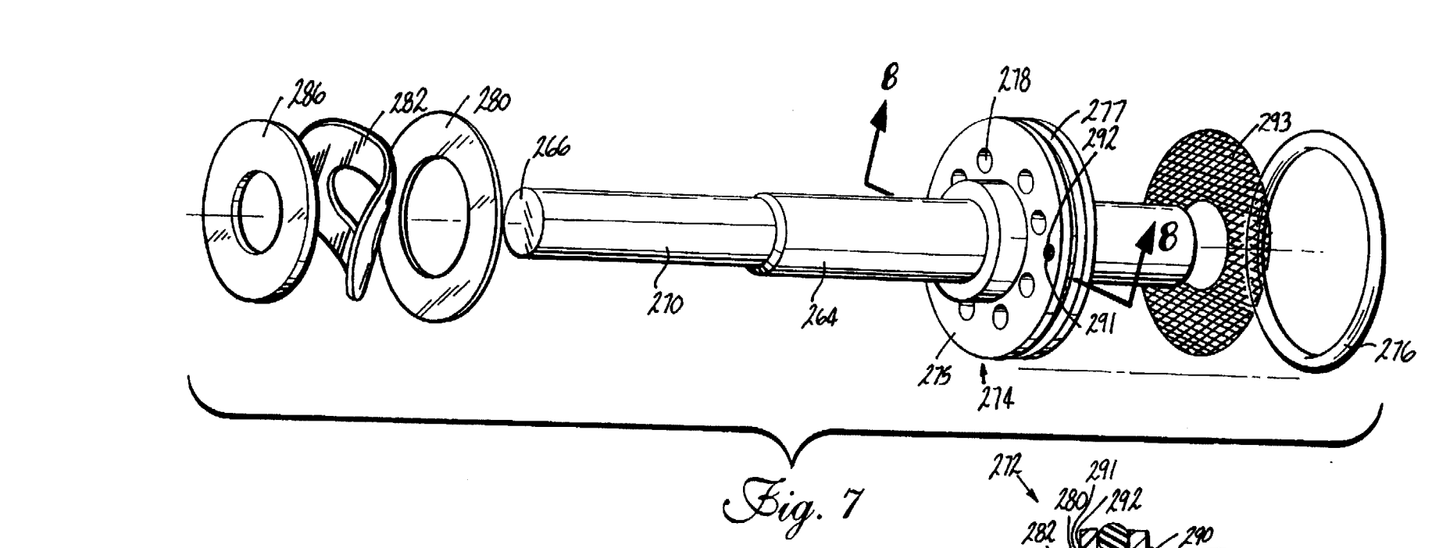
FIG. 7 is an exploded perspective view of a valve actuator of the valve assembly of FIG. 6.
Figure 8:
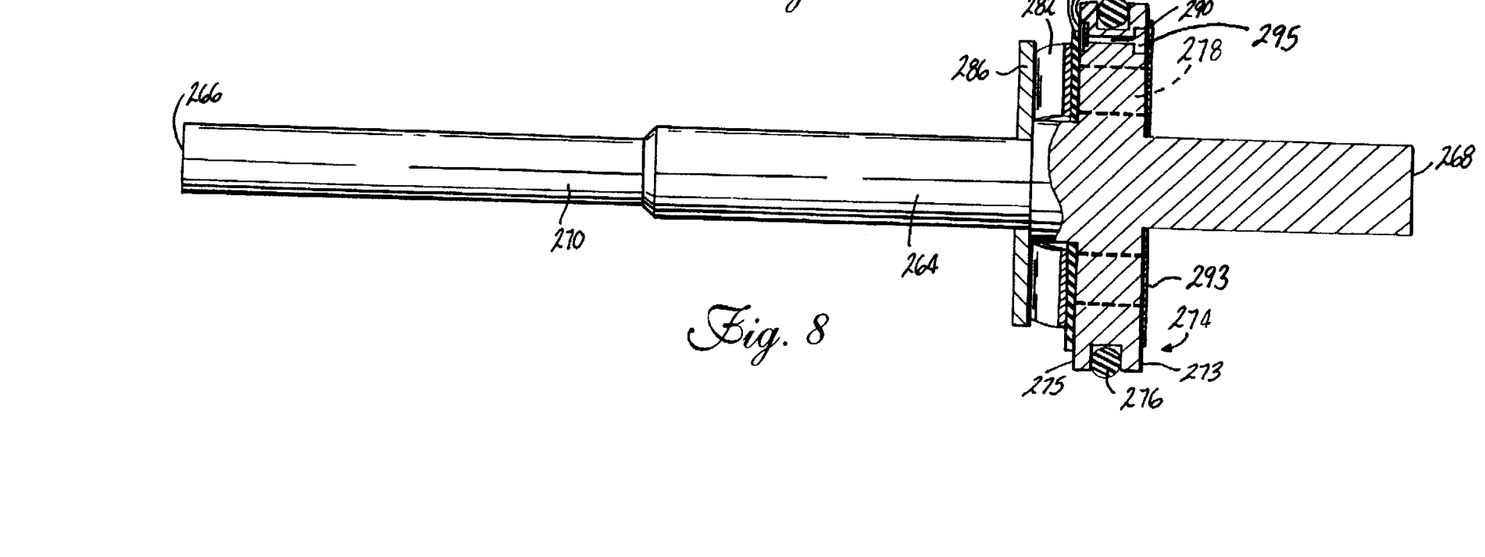
FIG. 8 is a side view in partial cross-section of the valve actuator of FIG. 7.

Turning to FIGS. 7 and 8, the valve actuators 222 and 224 have a slightly different configuration than in the previous embodiment. Each of the valve actuators 222 and 224 comprises an elongated cylindrical body 264 having a first end 266 and second end 268 and is sized to fit closely within the valve block coaxial bore 230. The first end 266 is positioned within the coaxial bore 230 adjacent the valve seat 240 and a reduced diameter portion 270 of the valve actuator body 264 at the first end 266 allows air to flow past the valve actuator body 264 from the valve seat 240 to the radial passages 238.

A check valve 272 on the valve actuator body 264 comprises a check valve disc or piston 274 extending outwardly radially from the valve actuator body 264 adjacent the second end 268. An O-ring 276 in an annular groove 277 about the check valve disc 274 seals the check valve disc 274 to the valve body 202 within the respective valve bore 210 or 212. A plurality of check valve apertures 278 extend from a first face 273 through to a second face 275 to penetrate the check valve disc 274. A thin elastomeric washer 280 is held in abutment with the second face 275 by a wave washer 282. A return spring 284 coaxially receives the valve actuator body 264 and extends from the valve block 214 or 216 to abut a retaining washer 286 which in turn abuts the wave washer 282 to urge the elastomeric washer 280 against the check valve disc 274. (See also FIG. 6.)

As in the previous embodiment, the valve bore 210 or 212 contains a viscous fluid 288. Thus, movement of the check valve disc 274 away from the valve block 214 or 216 forces the viscous fluid 288 through the check valve apertures 278 and the viscous fluid 288 moves the elastomeric washer 280 away from the check valve disc 274 so that the viscous fluid 288 can freely flow through the apertures 278. Due to the wave-like shape of the wave washer 282, the elastomeric washer 280 buckles slightly adjacent the check valve apertures 278 for the viscous fluid 288 to pass therethrough. The wave washer 282 thus merely holds the elastomeric washer 280 into loose abutment with the check valve disc 274.

Movement of the check valve disc 274 toward the valve block 214 or 216 compresses the viscous fluid 288 therebetween to urge the elastomeric washer 280 into sealing engagement with the check valve disc 274 thereby preventing passage of viscous fluid 288 through the check valve apertures 278. A separate smaller diameter control aperture 290 through the check valve disc 274 provides a restricted flow passage for viscous fluid 288 to flow past the check valve disc 274. A stepped notch 292 in the check valve disc 274 adjacent the control aperture 290 provides a passage for viscous fluid 288 around the elastomeric washer 280 and through the control aperture 290.

A small filter screen 291 retained in an outer portion of the notch 292 keeps the aperture 290 from becoming plugged. A second large filter screen 293 is affixed to the check valve first face 273 and covers the control aperture 290 and the check valve apertures 278. In addition to preventing any foreign particles from entering the control aperture 290, it also prevents particles from entering the coaxial bore 230 so that they cannot block the small filter screen 291. To affix the large filter screen 293 to the first face 273, an annular rib (not shown) is formed on the first face 273 and the large filter screen is placed against the rib. Thermal energy melts the rib to weld the large filter screen 293 to the first face 273. Also, a second notch 295 in the first face 273 at the control aperture 290 provides an area in which any particles that may bypass the filter screens 291 and 293 may reside without blocking the large filter screen 293 at the control aperture 290.

Preferably, eight check valve apertures 278 of 0.062 inch diameter are provided through the check valve disc 274 and a single control aperture 290, preferably of 0.013 inch (+ or −0.002 inch) diameter is also provided through the check valve disc 274. Thus, movement of the intake and exhaust valve actuators 222 and 224 toward the intake and exhaust valve blocks 214 and 216 is restricted by the incompressible viscous fluid 288 which must pass through the narrow control aperture 290. However, movement of the intake and exhaust valve actuators 222 and 224 away from the respective intake and exhaust valve blocks 214 and 216 is essentially unrestricted by the viscus fluid 288 which passes freely through the apertures 278 in this direction. The control aperture 290 provides increased control of the rate of travel of the respective intake and exhaust valve actuators 222 and 224 over the check valves 52 of the previous embodiment which rely upon a clearance dimension between the check valve disc 68 and valve bore 20 diameter.

An annular shoulder 294 is provided in the intake and exhaust valve bores 210 and 212 adjacent the check valve discs 274 to limit travel of the intake and exhaust valve actuators 222 and 224 away from their respective intake and exhaust valve blocks 214 and 216. The annular shoulders 294 replace the function of the stop 48 and stop chamber 58 of the previous embodiment. In the previous embodiment, the stop 48 threaded onto the actuator shaft 46 to be axially adjustable and thereby adjust the position of the actuator shaft 48 with respect to the sealing surface 122. In this embodiment, an adjusting screw 296 is axially threaded through a threaded aperture 298 in each of the intake and exhaust valve spring cups 218 and 220. A first end 299 of the adjusting screw 296 abuts the valve actuator body second end 268 with the return spring 284 biasing the valve actuator body 264 into abutment with the adjusting screw 296. Thus, the adjusting screw 296 fixes the resting position of the valve actuator first end 266 within the valve block coaxial bore 230.

Figure 9:
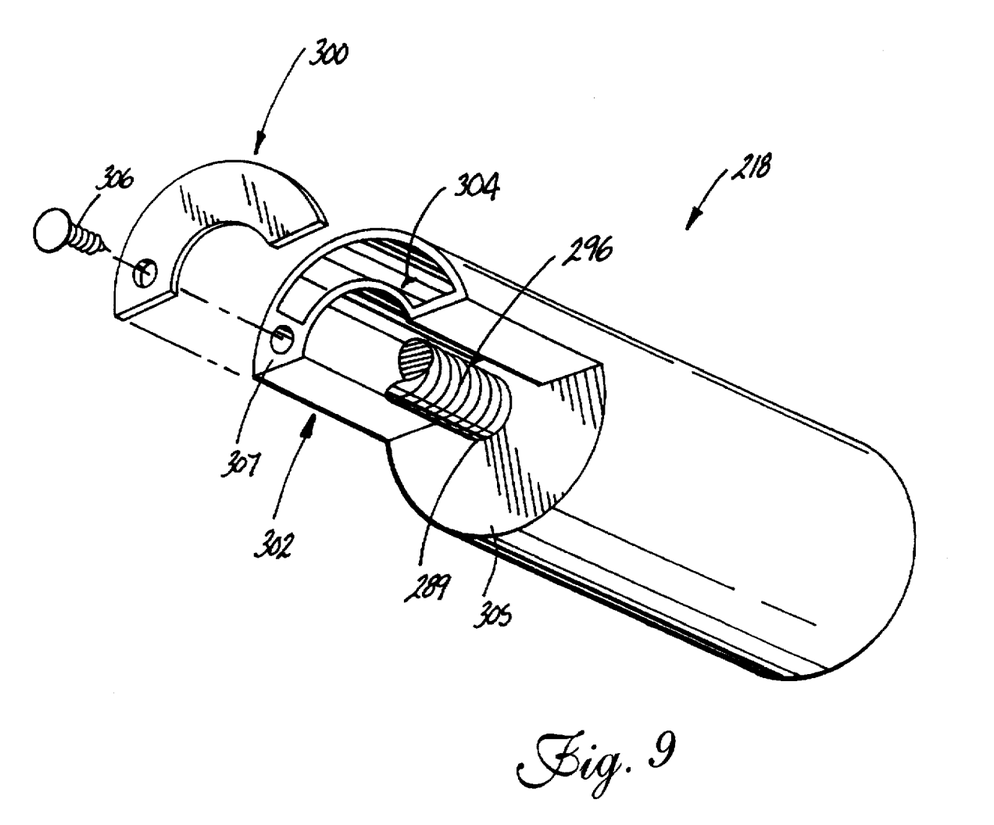
FIG. 9 is a perspective view of a spring cup of the valve assembly of FIG. 6.

As shown in FIGS. 6 and 9, a check valve 300 may also be provided to the spring cups 218 and 220 to reduce wear from contact with the control cam 208 and also to provide additional time delay to the height control valve assembly 200. The spring cups 218 and 220 each have a first side 301 and a second side 303. An abutment surface 305 on the second side 303 abuts the control cam 208. To prevent interference with the control cam 208, an extension 302 is provided for mounting the spring cup check valve 300 clear of the control cam 208 and abutment surface 305. The spring cup extensions 302 also limit the travel of the spring cups 218 and 220 toward their respective valve blocks 214 and 216 by forming a second abutment surface 307 for abutment with the annular shoulders 294, again replacing a function of the valve stop 48 and stop chamber 58 of the previous embodiment. As best seen in FIG. 9, the extension 302 is arcuate in cross-section and extends through slightly less than 180 degrees. An axial passage 304, also arcuate in cross-section, extends axially through the spring cup extension 302 to provide passage of viscous fluid 288 through the spring cup 218 or 220. A screw 306 extends axially into the spring cup extension 302 adjacent the arcuate passage 304 to hold the check valve 300 in place. By covering the axial passage 304 the check valve 300 prevents viscous fluid 288 from passing through the axial passage 304 as the spring cup 218 or 220 moves toward the respective valve block 214 or 216. Instead the viscous fluid 288 is forced to flow around the spring cup 218 or 220. Thus, actuation of the valve 204 or 206 is delayed. Movement of the spring cup 218 or 220 is not so retarded in the opposite direction as the check valve 300 will open to allow viscous fluid 288 to freely flow through the axial passage 304.

A major benefit of delay in the spring cups 218 and 220 is decreased wear on valve components. Irregularities in a road surface over which a vehicle employing the height control valve assembly 200 rides cause constant cycling of the control cam 208, with the control cam 208 typically rotating through + or −15° about 1.5 times in a one second time interval. Preferably, the tolerances between the spring cups 218 and 220 and their respective bores 210 and 212 will provide a three second delay for the spring cup 218 or 220 to return to the neutral position after a 15° rotation of the control cam 208 has pushed the spring cup 218 or 220 away from its respective valve block 214 or 216. Thus, the control cam 208 will be out of contact with the spring cups 218 and 220 most of the time, thereby reducing wear on the spring cups 218 and 220. Further, dynamic loading of the piston O-ring seal 276, the shaft packing 84 and the elastomeric washer 280 is also reduced with this arrangement.

End caps 308 cap and seal the valve bores 210 and 212 and compression springs 309 extend from the end caps 308 to bias the spring cups 218 and 220 toward the control cam 208. As in the previous embodiment, the springs 309 provide the motive force for operating the intake and exhaust valves 204 and 206.

Figure 10:
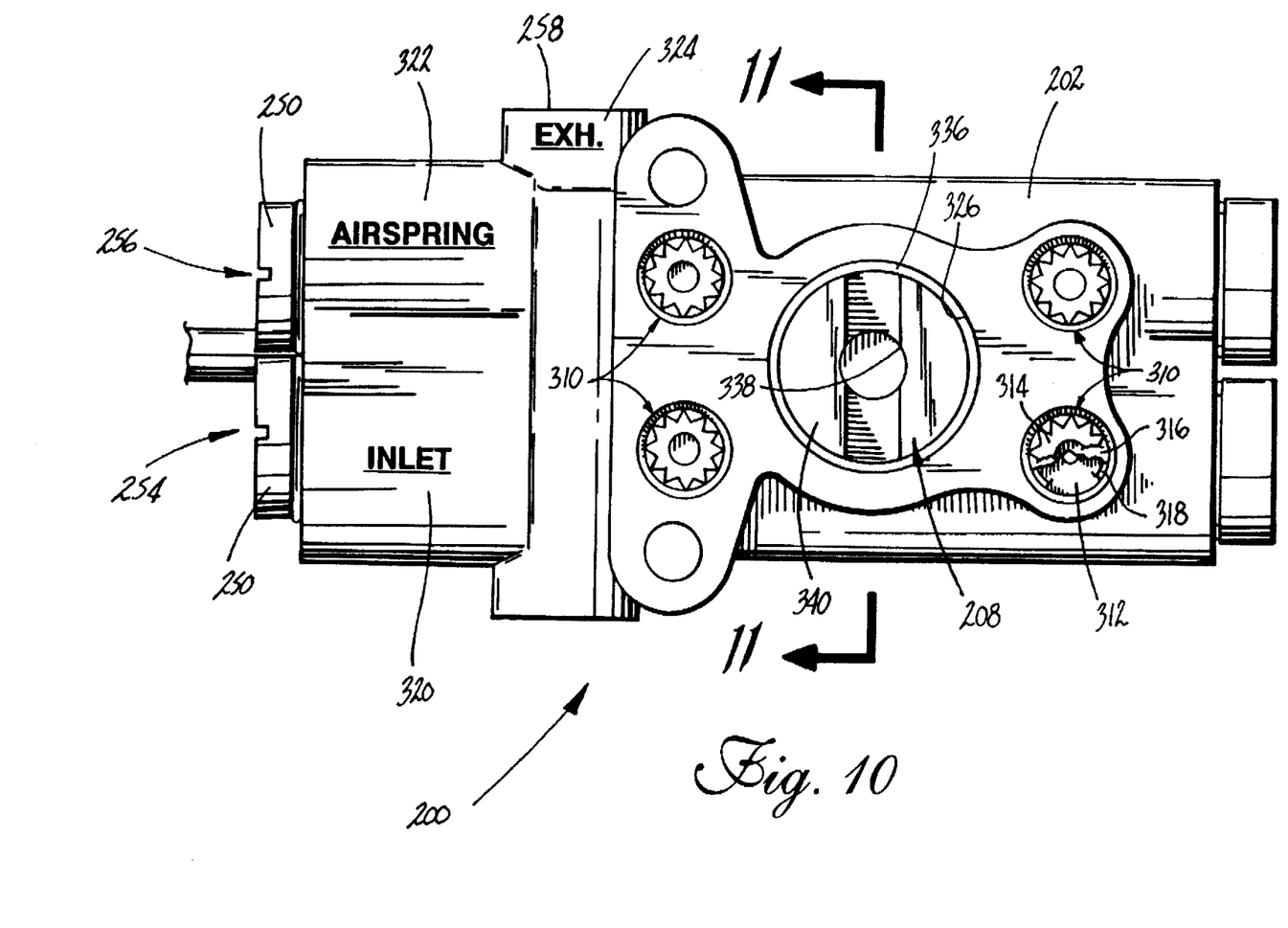
FIG. 10 is side elevation of the valve assembly of FIG. 6.

Turning to FIG. 10, two fill ports 310 are provided into each of the intake and exhaust valve bores 210 and 212 for filling the bores 210 and 212 with viscous fluid 288. Each of the fill ports 310 comprises an opening 312 through the body 202 into the respective intake or exhaust valve bore 210 or 212. A star washer 314 holds a plastic circular fill plug 316 in sealing abutment with an O-ring seal 318 to close the opening 312. The valve body 202 is filled by applying suction to the fill ports 310 located between the valve blocks 214 and 216 and the check valves 272 while furnishing viscous fluid 288 under pressure to the remaining fill ports 310 located on the opposite side of the check valves 272.

On the exterior of the valve body 202, the air supply port 254, device port 256 and exhaust port 258 are labeled with labels 320, 322 and 324, respectively. In the first embodiment, the filling and exhaust valves 14 and 16 are interchangeable, allowing easy reversal of the orientation of the height control valve assembly 10 during mounting. In the present embodiment, the intake and exhaust valves 204 and 206 are dedicated and the labels 320, 322 and 324 aid in proper plumbing of the valve assembly 200 during installation. To provide flexibility in mounting the valve, the control cam 208 passes completely through the valve body 202 as best seen in FIG. 11, whereby a linkage (not shown) may be connected to either end thereof.

Figure 11:
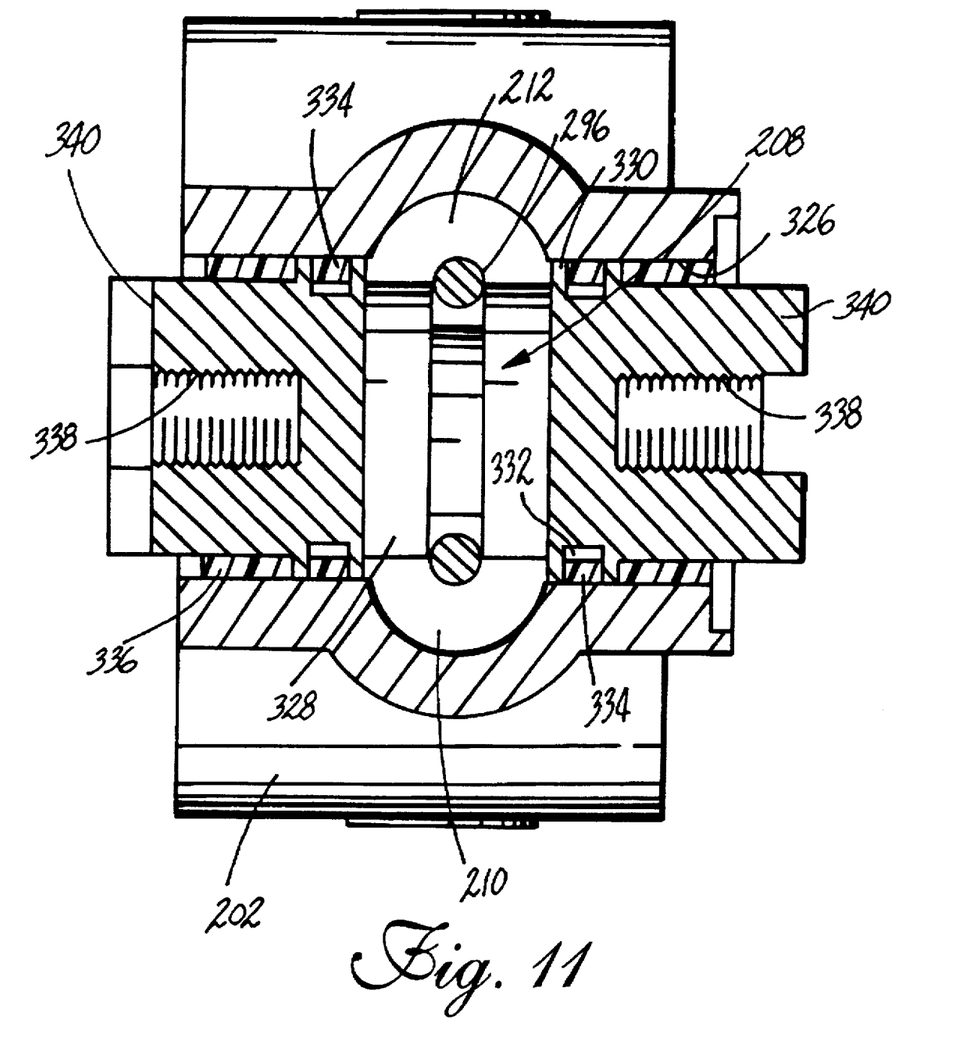
FIG. 11 is cross-sectional view of a control cam of the valve assembly of FIG. 6 taken along line 11—11 of FIG. 10.

Turning to FIG. 11, a control bore 326 passes through the valve body 202 transverse to the intake and exhaust valve bores 210 and 212. As in the previous embodiment, the control cam 208 has a pair of spaced apart cam lobes 328 centrally located thereon. Annular flanges 330 extend outwardly radially from the control cam 208 adjacent the cam lobes 328 and are sized to fit closely within the control bore 326. Each annular flange 330 has an annular groove 332 receiving a dynamic seal 334 to seal the viscous fluid 288 within the valve body 202. A Teflon™ bearing 336 encircles the control cam 208 immediately adjacent each of the annular flanges 332 to provide smooth rotation of the control cam 208 within the control bore 326. A friction fit between the bearing 336 and control bore 326 holds the control cam 208 in the control bore 326. Threaded openings 338 extend coaxially into cylindrical ends of the control cam 208 from each end to provide attachment for a linkage (not shown). A control linkage (not shown) can be threaded into either of the threaded openings 338 to control the valve. Which particular threaded opening 338 is selected depends on the side of the vehicle on which the valve will be mounted.

Preferably, the valve body 202 is cast of zinc which is corrosion resistant, machines easily to a smooth finish without burrs and has a relatively low coefficient of thermal expansion. The adjusting screws 296 are preferably formed of stainless steel, as is the control cam 208. The remaining structural parts are preferably formed of plastics such as low wear Delrin™ and Celcon™. These include the valve blocks 214 and 216, the spring cups 218 and 220, the valve actuators 222 and 224 and the disc valves 226 228. Preferably the end plugs 250 are formed of metal to provide a possible threaded connection to the air spring and air supply (not shown).

Initial adjustment of the intake and exhaust valves 204 and 206 is accomplished by assembling the valve blocks 214 and 216, spring cups 218 and 220, and valve actuators 222 and 224 into the valve bores 210 and 212. The valve blocks 214 and 216 are adjusted to a desired location within their respective valve bores 210 and 212 and the adjusting screws 296 are adjusted to align the valve actuator first ends 266 with the valve seats 240 on the valve blocks 214 and 216. Then, the valve blocks 216 are rotated slightly to provide a desired gap, approximately 0.010 inches, between the valve actuator ends 266 and valve seats 240. The remainder of the valve assembly 200 is then assembled and the valve body 202 is filled with viscous fluid 288 as previously described herein. If it is desired to later adjust the time delay or dead zone of either or both of the intake and exhaust valves 204 and 206, the viscous fluid 288 need not be removed from the valve body 202. Instead, the end plugs 250 are removed and the respective valve block 214 or 216 is axially repositioned within its respective valve bore 210 or 212.

Viewing the valve as shown in FIG. 6, a clockwise rotation of the control cam 208 allows the spring 309 to urge the intake spring cup 218 toward the intake valve block 214. The adjusting screw 296 thus urges the intake valve actuator 222 toward the intake disc valve 226. The viscous fluid 288 retards movement of the intake spring cup 218 and intake valve actuator 222 as previously described. If the control cam 208 continues to remain rotated in the clockwise direction as the intake valve actuator 222 moves through the dead zone, the intake valve actuator 222 will eventually lift the intake disc valve 226 off of the valve seat 240. When this happens, high pressure air will enter the air supply port 254, flow past the intake disc valve 226 into the coaxial bore 230 and the intake valve block 214, pass outwardly through the radial passage 238 into the annual chamber 236, through the air passage 260 and device port chamber 262 and out of the device port 256 into the controlled device, such as an air spring (not shown). When the control cam 208 moves back to its neutral position, the intake spring cup 218 and intake valve actuator 222 quickly return to their neutral position.

If the control cam 208 rotates counterclockwise, the spring 309 will urge the exhaust spring cup 220 and exhaust valve actuator 224 toward the exhaust disc valve 228. If the control cam 208 stays rotated long enough for the exhaust valve actuator 224 to pass through the dead zone, the exhaust disc valve 228 will lift off of the valve seat 240 and allow high pressure air from the control device to pass through the device port 256, past the exhaust disc valve 228 into the coaxial bore in the exhaust valve block 216, out through the radial passages 238 into the annual chamber 236 and out of the valve body 202 through the exhaust port 258 to atmosphere.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention. It is to be understood that the description of the particular embodiments contained herein is by way of illustration and not limitation, and that the scope of the appended claim should be construed as broadly as the prior art will permit.

What is claimed is:

1. A valve assembly comprising:

a body having a first valve bore filled with an incompressible fluid and a control bore transverse to and intersecting the first valve bore;

the body having a first port and a pressure chamber open to the first port;

the body having a second port and a second valve bore collinear with the first valve bore and open to the second port, the second valve bore having a first end open to the first valve bore and a second end open to the pressure chamber;

a valve seat in the body at the second valve bore second end and a sealing member at the valve seat for sealing the second end of the second valve bore when the sealing member is seated on the valve seat;

an actuator shaft disposed coaxially in the first and second valve bores and having a first end and a second end, the first end being disposed within the first bore and including a piston in the first bore and the second end being disposed in the second bore adjacent the valve seat whereby axial movement of the actuator shaft second end past the valve seat displaces the sealing member from the valve seat, and an actuator shaft biasing member between the body and the actuator shaft biasing the actuator shaft away from the valve seat;

a spring cup in the first valve bore and having a first end abutting the actuator shaft;

a spring cup biasing member biasing the spring cup toward the actuator shaft;

a control member rotatably mounted within the control bore, the control member having an abutment surface abutting the first end of the spring cup wherein abutment of the spring cup with the control member abutment surface limits movement of the spring cup toward the actuator shaft and wherein rotation of the control member moves the abutment surface axially in the first valve bore;

wherein the rotation of the control member in one direction moves the control member abutment surface toward the valve seat and thereby moves the spring cup and the actuator shaft toward the valve seat to displace the sealing member from the valve seat to place the first and second ports into fluid communication with each other;

wherein the piston and fluid dampen movement of the actuator shaft to provide a time delay in actuating the valve; and a piston check valve on said piston to enhance the flow of fluid from a first side of the piston to a second side of the piston as the actuator shaft moves away from the valve seat, and to restrict flow of fluid from the second side of the piston to the first side of the piston as the actuator shaft moves toward the valve seat.

2. A valve assembly according to claim 1 wherein the piston further comprises a seal abutting the valve body in the second bore and a metering orifice through the piston whereby the size of the metering orifice controls the damping effect of the piston as the actuator shaft moves toward the valve seat.

3. A valve assembly according to claim 1 wherein the piston check valve comprises at least one aperture through the piston and a flexible flap abutting the piston second side and covering the at least one aperture.

4. A valve assembly according to claim 3 wherein the piston further comprises a seal abutting the valve body in the second bore and a metering orifice through the piston whereby the size of the metering orifice controls the damping effect of the piston as the actuator shaft moves toward the valve seat.

5. A valve assembly according to claim 4 wherein the piston second side further comprises a notch at the metering orifice to prevent occlusion of the metering orifice by the flap.

6. A valve assembly according to claim 1 wherein the spring cup and actuator shaft form a driver, and further comprising a first stop between the driver and the body to limit the axial movement of the driver in the body away from the valve seat.

7. A valve assembly according to claim 6 and further comprising a second stop between the driver and the body to limit the axial travel of the actuator shaft toward the valve seat.

8. A valve assembly according to claim 7 wherein the first stop comprises a first body abutment surface on the body and extending into the first valve bore, a first driver abutment surface on the actuator shaft in interfering relationship with the first body abutment surface, the second stop comprises a second body abutment surface on the body and extending into the first valve bore and a second driver abutment surface on the spring cup in interfering relationship with the second body abutment.

9. A valve assembly according to claim 6 wherein the first stop comprises a first body abutment surface located on the body and extending into the first valve bore and a first driver abutment surface located on the actuator shaft.

10. A valve assembly according to claim 1 wherein the spring cup and actuator shaft form a driver, and further comprising a stop between the driver and the body to limit the axial travel of the actuator shaft toward the valve seat.

11. A valve assembly according to claim 10 wherein the stop comprises a body abutment surface on the body and extending into the first valve bore and an abutment surface on the spring cup in interfering relationship with the body abutment surface.

12. A valve assembly comprising:

a body having a first valve bore and a control bore transverse to and intersecting the first valve bore;

the body having a first port and a pressure chamber open to the first port;

the body having a second port and a second valve bore collinear with the first valve bore and open to the second port, the second valve bore having a first end open to the first valve bore and a second end open to the pressure chamber;

a valve seat in the body at the second valve bore second end and a sealing member at the valve seat for sealing the second end of the second valve bore when the sealing member is seated on the valve seat;

an actuator shaft disposed coaxially in the first and second valve bores and having a first end and a second end, the first end being disposed within the first bore and the second end being disposed in the second bore adjacent the valve seat whereby axial movement of the actuator shaft second end past the valve seat displaces the sealing member from the valve seat, and an actuator shaft biasing member between the body and the actuator shaft biasing the actuator shaft away from the valve seat;

a spring cup in the first valve bore and having a first end abutting the actuator shaft;

a spring cup biasing member biasing the spring cup toward the actuator shaft;

a control member rotatably mounted within the control bore, the control member having an abutment surface abutting the first end of the spring cup wherein abutment of the spring cup with the control member abutment surface limits movement of the spring cup toward the actuator shaft and wherein rotation of the control member moves the abutment surface axially in the first valve bore;

wherein the rotation of the control member in one direction moves the control member abutment surface toward the valve seat and thereby moves the spring cup and the actuator shaft toward the valve seat to displace the sealing member from the valve seat to place the first and second ports into fluid communication with each other; and wherein the spring cup further comprises a port between the first end of the spring cup and a second end of the spring cup, a port check valve between the first and second end of the spring cup to permit the flow of fluid through the port from the second end of the spring cup to the first end of the spring cup as the spring cup moves away from the valve seat, and to restrict flow of fluid through the port from the first end of the spring cup to the second end of the spring cup as the spring cup moves toward the valve seat.

13. A valve assembly according to claim 12 wherein the spring cup first end comprises an extension extending toward the valve seat past the control member abutment surface, the spring cup check valve being located on the extension and the spring cup port being located in the extension whereby interference with the check valve by the control member abutment surface is avoided.

14. A valve assembly comprising:

a body having a first valve bore and a control bore transverse to and intersecting the first valve bore;

the body having a first port and a pressure chamber open to the first port;

the body having a second port and a second valve bore collinear with the first valve bore and open to the second port, the second valve bore having a first end open to the first valve bore and a second end open to the pressure chamber;

a valve seat in the body at the second valve bore second end and a sealing member at the valve seat for sealing the second end of the second valve bore when the sealing member is seated on the valve seat;

an actuator shaft disposed coaxially in the first and second valve bores and having a first end and a second end, the first end being disposed within the first bore and the second end being disposed in the second bore adjacent the valve seat whereby axial movement of the actuator shaft second end past the valve seat displaces the sealing member from the valve seat, and an actuator shaft biasing member between the body and the actuator shaft biasing the actuator shaft away from the valve seat;

a spring cup in the first valve bore and having a first end abutting the actuator shaft;

a spring cup biasing member biasing the spring cup toward the actuator shaft;

a control member rotatably mounted within the control bore, the control member having an abutment surface abutting the first end of the spring cup wherein abutment of the spring cup with the control member abutment surface limits movement of the spring cup toward the actuator shaft and wherein rotation of the control member moves the abutment surface axially in the first valve bore;

wherein the rotation of the control member in one direction moves the control member abutment surface toward the valve seat and thereby moves the spring cup and the actuator shaft toward the valve seat to displace the sealing member from the valve seat to place the first and second ports into fluid communication with each other;

the spring cup first end comprises a first surface for contact with the control member and a second surface abutting the actuator shaft; and an adjusting element for adjusting the position of the first surface with respect to the second surface whereby a neutral position of the actuator shaft can be adjusted by the adjusting element.

15. A valve assembly according to claim 14 wherein the adjusting element comprises an adjusting screw threaded axially through a wall of the spring cup and the second spring cup surface is formed by an end of the adjusting screw.

16. A valve assembly comprising:

a body having a first valve bore and a control bore transverse to and intersecting the first valve bore;

the body having a first port and a pressure chamber open to the first port;

the body having second port and a second valve bore collinear with the first valve bore and open to the second port, the second valve bore having a first end open to the first valve bore and a second end open to the pressure chamber;

a valve seat in the body at the second valve bore second end and a sealing member at the valve seat for sealing the second end of the second valve bore when the sealing member is seated on the valve seat;

an actuator shaft disposed coaxially in the first and second valve bores and having a first end and a second end, the first end being disposed within the first bore and the second end being disposed in the second bore adjacent the valve seat whereby axial movement of the actuator shaft second end past the valve seat displaces the sealing member from the valve seat, and an actuator shaft biasing member between the body and the actuator shaft biasing the actuator shaft away from the valve seat;

a control member rotatably mounted within the control bore, the control member being operably coupled to the actuator shaft for axial movement of the actuator shaft upon rotation of the control member;

a motion damping piston on the actuator shaft and having a first side, a second side, and an axial port extending through the piston between the first and second sides for flow of fluid therethrough, the piston being disposed within the first valve bore with a seal therebetween and the first valve bore being filled with an incompressible fluid wherein the piston and fluid dampen movement of the actuator shaft to provide a time delay in actuating the valve;

a check valve associated with said axial port to permit unrestricted flow of fluid from the first side of the piston to the second side as the actuator shaft moves away from the valve seat, and to restrict flow of fluid from the second side of the piston to the first side of the piston as the actuator shaft moves toward the valve seat; and a metering orifice through the piston whereby the size of the metering orifice controls the damping effect of the piston as the actuator shaft moves toward the valve seat.

17. A valve assembly according to claim 16 wherein the piston check valve comprises a flexible flap abutting the piston second side and covering the axial port.

18. A valve assembly according to claim 17 wherein the piston second side has a notch at the metering orifice to prevent occlusion of the metering orifice by the flap.

* * * * *